United States Patent [19]

Rebane

[11] 3,901,977

[45] Aug. 26, 1975

[54] STORABLE HIGH PROTEIN CHOCOLATE SNACKS

[75] Inventor: Arnold Rebane, Villa Park, Ill.

[73] Assignee: Sandoz Inc., E. Hanover, N.J.

[22] Filed: Mar. 22, 1974

[21] Appl. No.: 453,883

Related U.S. Application Data

[63] Continuation-in-part of Ser. No. 257,770, May 30, 1972, abandoned.

[52] U.S. Cl. ............ 426/631; 426/656; 426/810
[51] Int. Cl.² .................. A23G 3/00; A23G 1/00
[58] Field of Search ......... 426/146, 171, 173, 356, 426/357, 358, 359, 364, 810

[56] References Cited
UNITED STATES PATENTS

| | | |
|---|---|---|
| 2,634,210 | 4/1953 | Kimball ............ 426/72 |
| 3,431,112 | 3/1969 | Durst ............ 426/89 |
| 3,431,117 | 3/1969 | Lorant ............ 426/164 |
| 3,434,843 | 3/1969 | Durst ............ 426/98 |
| 3,446,623 | 5/1969 | Gray et al. ............ 426/311 |

Primary Examiner—James R. Hoffman
Attorney, Agent, or Firm—Gerald D. Sharkin; Robert S. Honor; Thomas O. McGovern

[57] ABSTRACT

High protein chocolate snacks which retain their flavor and texture during storage are prepared by adding calcium caseinate, sodium caseinate and peanut butter to a uniform mixture of milk chocolate, dark chocolate and cocoa butter at a temperature between 80° and 100°F.

17 Claims, No Drawings

STORABLE HIGH PROTEIN CHOCOLATE SNACKS

This application is a continuation-in-part of copending application Ser. No. 257,770, filed May 30, 1972 now abandoned.

This invention relates to a highly nutritious chocolate snack. More particularly, this invention relates to high protein chocolate snacks which retain their excellent flavor and texture during prolonged storage at ambient temperatures. This invention further relates to a process for preparing high protein chocolate snacks with excellent storage capacity.

The need for a stable, highly nutritious, high protein chocolate snack for use by the military, spacemen, campers, athletes and the like has long been recognized. A major problem with such foods has been their poor storage qualities. On standing during prolonged ambient storage, the high protein chocolate products now available lose their flavor and their texture deteriorates.

According to the present invention, there is provided a nutritious, stable, high protein chocolate snack which contains 30 to 50 percent, preferably 40 percent chocolate, 15 to 30 percent protein and 0.5 to 2.5 percent calcium caseinate. Except when otherwise indicated in the following description of the invention and in the claims, all percentages are by weight based on the final weight of the chocolate snack.

The chocolate portion normally consists of 15 to 25 percent milk chocolate and 15 to 25 percent dark chocolate. The milk chocolate contains at least 10 percent chocolate liquor according to the Federal Standards of Identity and the dark chocolate contains at least 15 percent chocolate liquor. The chocolate snack of the instant invention contains about 4.8 to 6.3 percent chocolate liquor in all.

The majority of the protein in the chocolate snack is provided by proteinaceous ingredients such as sodium caseinate, which contains about 90 percent by weight protein, and is present in the chocolate snack at levels of about 10 to 20 percent, preferably 15 to 20 percent, and peanut butter which contains about 25 percent by weight protein and is present in the chocolate at levels of about 15 to 20 percent. These proteinaceous ingredients comprise about 25 to 40 percent of the contemplated chocolate snack. In addition to these ingredients, protein is also provided by the milk chocolate and dark chocolate which contains about 7.5 to about 8.0 percent protein based on the weight of the chocolate and by the calcium caseinate which is about 88 percent protein.

The instant invention also contemplates the use of sweetener such as sugar in the range of 10 to 15 percent; and corn syrup is also generally used at levels of 3 to 5 percent in the chocolate snack. In addition, vitamins and minerals which are compatible with the ingredients of the snack can also be added if desired to further enhance the nutritional value of high protein chocolate snack of this invention.

A typical formulation and range of ingredients for the chocolate snack contemplated in this invention is as follows:

| Ingredient | Range (Percent) |
|---|---|
| Milk chocolate | 15 – 25 |
| Dark chocolate | 15 – 25 |
| Cocoa butter | 5 – 15 |
| Sodium caseinate | 10 – 20 |
| Calcium caseinate | 0.5 – 2.5 |
| Sugar | 10 – 15 |
| Corn syrup | 3 – 5 |
| Peanut butter | 15 – 20 |

The above formulation provides chocolate snacks having a protein content ranging between 15 to 30 percent by weight.

The present invention also provides a method of preparing a nutritious, uniform, high protein chocolate snack containing 30 to 50 percent by weight of chocolate and 15 to 30 percent by weight of protein which retains its flavor and texture during storage which comprises adding to a uniform mixture containing 15 to 25 percent milk chocolate, 15 to 25 percent dark chocolate and 5 to 15 percent cocoa butter at a temperature between 80° to 100°F, 0.5 percent to 2.5 percent calcium caseinate and 25 to 40 percent proteinaceous ingredient, and stirring the mixture until uniform while maintaining the temperature between 80° to 100°F. More particularly, the process of the instant invention is carried out in accordance with the following steps:

a. Slowly heating a mixture which contains 15 to 25 percent milk chocolate, 15 to 25 percent dark chocolate and 5 to 15 percent cocoa butter to a temperature between 130° to 150°F and mixing until uniform;

b. Cooling the mixture to a temperature of 80° to 100°F with continuous stirring;

c. Adding 0.5 percent to 2.5 percent calcium caseinate and 25 to 40 percent proteinacious ingredients;

d. Stirring the mixture until uniform while maintaining the temperature between 80° to 100°F.

It is preferred that steps $a$, $b$, $c$ and $d$ be carried out between 85° to 98°F. The sweetener and corn oil normally incorporated in the chocolate snack are usually added along with the peanut butter in the form of a peanut crunch in step $c$. Following step $d$, the melted composition, after mixing, can be formed into any of the conventional chocolate snack forms using standard techniques. For example, the melted chocolate can be spread out in sheet as thin as desired, chilled to about 45° to 70°F, preferably 65° to 70°F and then cut to the desired size and shape and packaged. Alternately, molds of various shapes can be filled with the melted chocolate, which can then be chilled to 45°F, after which the finished product is removed from the mold and packaged. The melted chocolate can also be extruded through a specific orifice, e.g., rod, ribbon, etc., cooled to 45° to 55° F in a cooling tunnel and packaged.

EXAMPLE 1

The following ingredients were used in the preparation of a high protein chocolate bar having a protein content of approximately 23 percent.

| | |
|---|---|
| Milk chocolate (7.6% protein) | 19.90% |
| Dark chocolate (7.9% protein) | 19.90% |
| Cocoa butter | 8.20% |
| Sodium caseinate (90% protein) | 15.74% |
| Calcium caseinate (88% protein) | 1.13% |

-Continued

| | |
|---|---|
| Granulated sugar | 13.60% |
| Corn syrup | 4.55% |
| Peanut butter (25.5% protein) | 16.98% |

The chocolate and cocoa butter are heated slowly to a temperature of 135° to 140°F. The mixture is then cooled with stirring to a temperature of 81° to 82°F. A peanut butter crunch mixture is prepared from sugar, corn syrup and peanut butter by heating the sugar and corn oil to 305°F, and adding the peanut butter and mixing. The chocolate phase is reheated to 95° to 98°F and then cooled to 88°F at which point the sodium caseinate, calcium caseinate and peanut butter crunch are added. The mixture is under continuous stirring during the addition of the ingredient, and stirring is continued after addition is completed until a uniform mixture is obtained. The mixture is then spread on aluminum foil with a teflon covered surface to a thickness of ¼ to ½ inches and cooled to 65° to 70°F. The chocolate formulation is then cut into bars 3½ inches by 1⅝ inches and packaged in tinfoil.

The bars are stored under ambient conditions for a period of 248 days and at intervals of 30 days the bars are checked for flavor and texture. It is found that over this period that the bars retain their excellent flavor and texture.

Similar chocolate bars, but without the calcium caseinate, are also prepared and tested. These bars show signs of deterioration after 7 months and began losing texture after 8 months.

What is claimed is:

1. A method of preparing a nutritious, uniform, high protein chocolate snack containing 30 to 50 percent by weight of chocolate and 15 to 30 percent by weight of protein which retains its flavor and texture during storage, which comprises adding to a uniform mixture which contains by weight, based on the final weight of the snack, 15 to 25 percent milk chocolate, 15 to 25 percent dark chocolate and 5 to 15 percent cocoa butter at a temperature between 80° to 100°F, 0.5 to 2.5 percent by weight based on the final weight of the snack of calcium caseinate, 10 to 20 percent by weight of sodium caseinate based on the final weight of the snack and 15 to 20 percent by weight of peanut butter based on the final weight of the snack and stirring the mixture until uniform while maintaining the temperature between 80° to 100°F.

2. A method, according to claim 1, of preparing a nutritious, uniform, high protein chocolate snack containing 30 to 50 percent by weight of chocolate and 15 to 30 percent by weight of protein, which retains its flavor and texture during storage, comprising the steps:

a. Slowly heating a mixture which contains, based on the final weight of the snack, 15 to 25 percent milk chocolate, 15 to 25 percent dark chocolate, and 5 to 15 percent cocoa butter to a temperature between 130° to 150°F, and mixing until uniform;
   b. Cooling the mixture to a temperature of 80° to 100°F., with continuous stirring;
   c. Adding 0.5 to 2.5 percent by weight of calcium caseinate based on the final weight of the snack, 10 to 20 percent by weight of sodium caseinate based on the final weight of the snack and 15 to 20 percent by weight of peanut butter based on the final weight of the snack; and
   d. Stirring the mixture until uniform while maintaining the temperature between 80° to 100°F.

3. A method according to claim 2 in which steps b, c and d are carried out at a temperature of 85° to 98°F.

4. A method according to claim 2 in which following step d the snack is cooled to 45° to 70°F.

5. A method according to claim 2 in which, following step d, the snack is cooled to 65° to 70°F.

6. A method according to claim 2 in which the chocolate snack contains 40 percent chocolate.

7. A method according to claim 2 in which 10 to 15 percent by weight based on the final weight of the snack, of sugar is added in step d.

8. A method according to claim 2 in which the peanut butter is added in the form of a peanut butter crunch in combination with, based on the final weight of the chocolate snack, 10 to 15 percent sugar and 3 to 5 percent corn oil.

9. A method according to claim 8 in which the sugar and corn oil are heated to 305°F, and the peanut butter is added to form a mixture which is stirred until uniform.

10. A nutritious, high protein, chocolate snack having excellent storage capacity containing 30 to 50 percent by weight of chocolate and 15 to 30 percent by weight of protein which is prepared by adding to a uniform mixture which contains by weight, based on the final weight of the snack, 15 to 25 percent milk chocolate, 15 to 25 percent dark chocolate and 5 to 15 percent cocoa butter at a temperature between 80° to 100°F, 0.5 to 2.5 percent by weight based on the final weight of the snack of calcium caseinate, 10 to 20 percent by weight of sodium caseinate based on the final weight of the snack and 15 to 20 percent by weight of peanut butter based on the final weight of the snack and stirring the mixture until uniform while maintaining the temperature between 80° to 100°F.

11. A nutritious high protein chocolate snack according to claim 10 which contains by weight based on the final weight of the snack 40 percent by weight of chocolate, 25 to 40 percent by weight of proteinaceous ingredients and 0.5 to 2.5 percent by weight of calcium caseinate.

12. A nutritious, high protein chocolate snack according to claim 10 which contains, based on the final weight of the snack, 10 to 15 percent by weight of sugar.

13. A nutritious high protein chocolate snack according to claim 10 which is in the form of a chocolate bar.

14. A nutritious, high protein, chocolate snack according to claim 10, which is prepared by the steps:

a. Slowly heating a mixture which contains, based on the final weight of the snack, 15 to 25 percent milk chocolate, 15 to 25 percent dark chocolate, and 5 to 15 percent cocoa butter to a temperature between 130° to 150°F, and mixing until uniform;
   b. Cooling the mixture to a temperature of 80° to 100°F, with continuous stirring;
   c. Adding 0.5 to 2.5 percent by weight of calcium caseinate based on the final weight of the snack, 10 to 20 percent by weight of sodium caseinate based on the final weight of the snack and 15 to 20 percent by weight of peanut butter based on the final weight of the snack; and
   d. Stirring the mixture until uniform while maintaining the temperature between 80° to 100°F.

15. A chocolate snack according to claim 14 in which steps b), c), and d) are carried out at a temperature of 85° to 98°F.

16. A chocolate snack according to claim 14 in which following step d), the snack is cooled to 45° to 70°F.

17. A chocolate snack according to claim 14 in which following step d), the snack is cooled to 65° to 70°F.

* * * * *